(No Model.)

S. C. DICKSON.
COTTON THINNER.

No. 335,180. Patented Feb. 2, 1886.

WITNESSES
James B. Clarke
D. L. Lewis.

INVENTOR
S. C. Dickson
by E. H. Bates
His Attorney.

N. PETERS, Photo-Lithographer, Washington, D. C.

UNITED STATES PATENT OFFICE.

SPARTAN COLUMBUS DICKSON, OF GREENVILLE, SOUTH CAROLINA.

COTTON-THINNER.

SPECIFICATION forming part of Letters Patent No. 335,180, dated February 2, 1886.

Application filed November 18, 1885. Serial No. 183,188. (No model.)

*To all whom it may concern:*

Be it known that I, SPARTAN C. DICKSON, a citizen of the United States, residing at Greenville, in the county of Greenville and State of South Carolina, have invented certain new and useful Improvements in Combined Cotton-Thinners, Cultivators, and Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
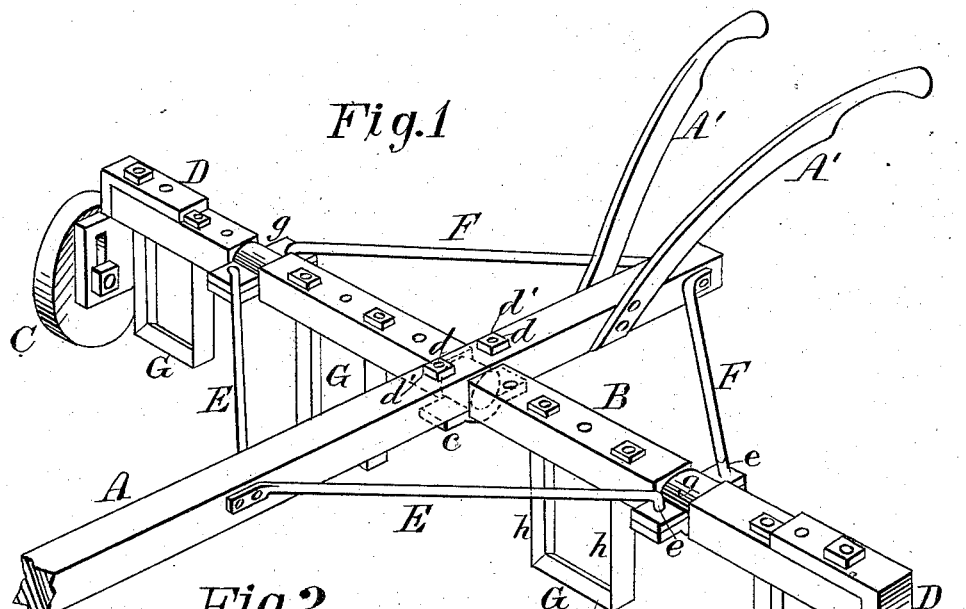
Figure 2:
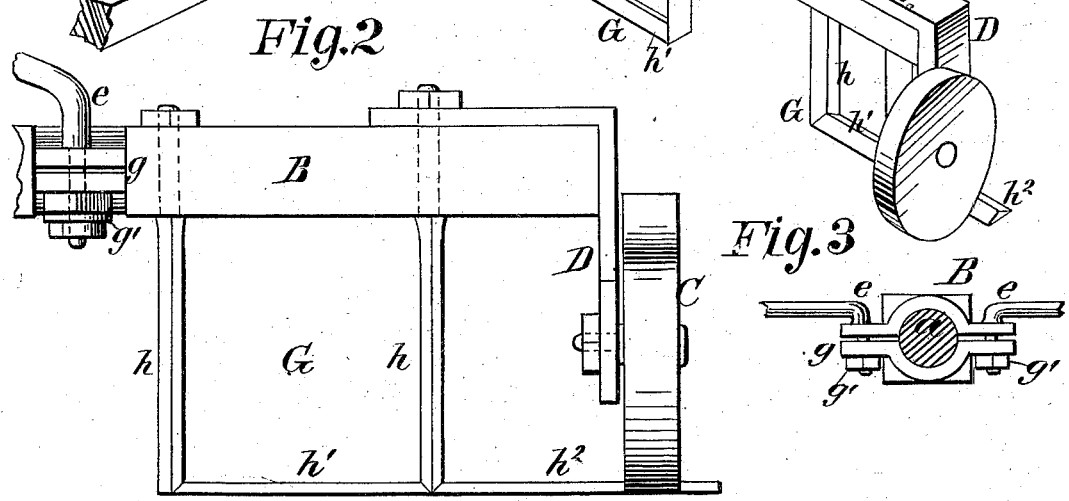
Figure 3:
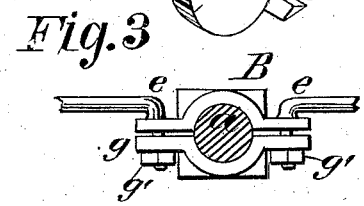
Figure 4:

Figure 1 is a perspective view of the improved implement adapted for thinning cotton-plants. Fig. 2 is an enlarged front view in detail of one end of the beam B, showing the extension of the blade of a scraper in rear of the supporting-wheel. Fig. 3 is an enlarged cross-section on line $x$ $x$, Fig. 2. Fig. 4 is a cross-section through one of the scrapers or thinners and its beam.

This invention relates to improvements on implements which are designed for thinning out cotton-plants, also for cultivating the soil, and also for harrowing the same; and it consists in an implement the peculiarities of which will be fully understood from the following description, when taken in connection with the annexed drawings.

A designates the longitudinal or draft beam, which is provided with handles A' A', like a well-known hand cotton-thinner or cultivator.

B designates a horizontal cross-beam, of any suitable length, which is constructed with cylindrical portions $a$, preferably re-enforced by metal bands. This beam B is attached at the middle of its length to the beam A by means of a half-round bearing in the latter beam and an adjustable clamp bearing or cap, $c$, by loosening the nuts $d$ $d$ on the bolts $d'$ $d'$ of which the cross-beam B can be adjusted about its longitudinal axis, for a purpose hereinafter explained.

For some kinds of soil I mount the implement on two wheels, C C, which I prefer to apply to short axles vertically adjustable in slotted angle-irons D D, rigidly secured to the said cross-beam at its ends.

E E and F F designate front and rear diagonal braces, which are bolted to the beam A, and provided with angular and shouldered screw-threaded ends $e$ $e$, adapted to pass through the ears of half-round clamping-bearings $g$ $g$, and to receive nuts $g'$ $g'$, by means of which and the nuts $d$ $d$ the cross-beam B is prevented from turning about its longitudinal axis.

G G G G designate the devices used for thinning out cotton-plants. Each one of these devices consists of two standards, $h$ $h$, which may have cutting-edges in front and rear, and a horizontal blade, $h'$, which is also preferably made with two cutting-edges, so that each thinner is reversible. The end thinners are made with their horizontal blades extended out laterally, as shown at $h^2$, for the purpose of cutting in the tracks of the wheels C. The standards $h$ $h$ of the thinners G may be rigidly secured to the beam B by bolts, as shown in the drawings. I make supplemental holes through the beam B, for receiving the bolts on the standards of the thinners, and allowing the same to be set at different distances apart. It will be seen that by simply loosening the nuts $d$ $d$ and $g$ $g$ $g$ $g$ the cross-beam B can be turned about its longitudinal axis and all of the cutting-blades $h'$ adjusted together and given any desired degree of pitch or inclination.

I may remove the cotton-thinners from the beam B and substitute harrow-teeth; or, if desirable, light plows may be employed, thus converting the machine into a cultivator.

It is obvious that I may apply more than one cross-beam (braced and made adjustable, as described) to the longitudinal beam A, and attach either harrow-teeth, drill-teeth, or cultivator-teeth to said beams, by which means I have a very simple convertible implement.

Having described my invention, what I claim as new is—

1. The within-described farm implement, consisting of the longitudinal beam A, the cross-beam B, the front and rear braces, and the adjustable clamping-bearings, all combined and constructed as shown and described.

2. The combination of the longitudinal beam A, the cross-beam B, adjustably connected to this beam by the clamping-bearings, the front and rear braces, the reversible or double-cutting thinners, and the adjustably-connected supporting-wheels, as described.

3. In combination with the beams A and B, their clamps and braces, the end thinners having their cutting-blades extended out across the tracks of the supporting-wheels C, as and for the purposes described.

In testimony whereof I affix my signature in presence of two witnesses.

SPARTAN COLUMBUS DICKSON.

Witnesses:
 WM. A. WILLIAMS,
 J. A. MOONEY.